United States Patent
Kanai et al.

(10) Patent No.: US 11,898,035 B2
(45) Date of Patent: **\*Feb. 13, 2024**

(54) POLYAMIDE COMPOSITION, AND MOLDED ARTICLE INCLUDING SAME

(71) Applicant: KURARAY CO., LTD., Okayama (JP)

(72) Inventors: Shimon Kanai, Tsukuba (JP); Takaharu Shigematsu, Tsukuba (JP)

(73) Assignee: KURARAY CO., LTD., Okayama (JP)

( * ) Notice: Subject to any disclaimer, the term of this patent is extended or adjusted under 35 U.S.C. 154(b) by 400 days.

This patent is subject to a terminal disclaimer.

(21) Appl. No.: 17/269,663

(22) PCT Filed: Aug. 21, 2019

(86) PCT No.: PCT/JP2019/032624
§ 371 (c)(1),
(2) Date: Feb. 19, 2021

(87) PCT Pub. No.: WO2020/040192
PCT Pub. Date: Feb. 27, 2020

(65) Prior Publication Data
US 2021/0340376 A1 Nov. 4, 2021

(30) Foreign Application Priority Data

Aug. 24, 2018 (JP) .................................. 2018-157562

(51) Int. Cl.
| | | |
|---|---|---|
| C08L 77/06 | (2006.01) | |
| C08L 25/08 | (2006.01) | |
| C08L 25/18 | (2006.01) | |
| C08F 220/32 | (2006.01) | |
| B29C 45/00 | (2006.01) | |
| C08F 222/06 | (2006.01) | |
| C08K 5/00 | (2006.01) | |
| C08K 7/14 | (2006.01) | |
| B29K 77/00 | (2006.01) | |

(52) U.S. Cl.
CPC .......... *C08L 77/06* (2013.01); *B29C 45/0001* (2013.01); *C08F 220/325* (2020.02); *C08F 222/06* (2013.01); *C08K 5/0066* (2013.01); *C08K 7/14* (2013.01); *C08L 25/08* (2013.01); *C08L 25/18* (2013.01); *B29C 2945/76498* (2013.01); *B29C 2945/76531* (2013.01); *B29K 2077/00* (2013.01); *C08L 2201/02* (2013.01); *C08L 2203/20* (2013.01); *C08L 2203/30* (2013.01)

(58) Field of Classification Search
CPC .... C08L 77/00–06; C08L 25/04; C08L 25/08; C08L 25/16; C08L 25/18; C08L 27/24; C08L 2201/02; C08L 2666/84
See application file for complete search history.

(56) References Cited

U.S. PATENT DOCUMENTS

| | | | |
|---|---|---|---|
| 2002/0065356 A1 | 3/2002 | Crevecoeur et al. | |
| 2011/0196080 A1 | 8/2011 | Matsuoka et al. | |
| 2016/0342003 A1* | 11/2016 | Takeda ............. | B29D 11/00788 |

FOREIGN PATENT DOCUMENTS

| | | |
|---|---|---|
| CN | 106751641 A | 5/2017 |
| JP | H8-239574 A | 9/1996 |
| JP | 2002-508797 A | 3/2002 |
| JP | 2003-82228 A | 3/2003 |
| JP | 2007-291249 A | 11/2007 |
| JP | 2007-291250 A | 11/2007 |
| JP | 2009-275216 A | 11/2009 |
| JP | 2011-80046 A | 4/2011 |
| JP | 2014-15594 A | 1/2014 |
| KR | 20160038412 A * | 4/2016 |
| WO | WO 2009/017043 A1 | 2/2009 |

OTHER PUBLICATIONS

KR 20160038412 A machine translation (Apr. 2016).*
Search Report issued in EP Patent Application No. 19851222.0, dated Jun. 1, 2022.
ISR for PCT/JP2019/032624, dated Nov. 5, 2019.
Written Opinion for PCT/JP2019/032624, dated Nov. 5, 2019.

* cited by examiner

*Primary Examiner* — Ana L. Woodward
(74) *Attorney, Agent, or Firm* — GREENBLUM & BERNSTEIN, P.L.C.

(57) ABSTRACT

Provided are a polyamide composition containing a polyamide (A) having a melting point of 280° C. or higher and a flame retardant (B), which is such that, when a melt of the polyamide composition is injection-molded with a mold having a thickness of 0.5 mm and a width of 40 mm under the condition of a cylinder temperature higher by 20° C. than the melting point of the polyamide (A), an injection pressure of 74 MPa and a mold temperature of 140° C., the flow length is 40 mm or more, and that the melt flow rate at a temperature of 320° C. and under a load of 2.16 kg is 15 g/10 min or less; and a molded article of the polyamide composition.

12 Claims, No Drawings

POLYAMIDE COMPOSITION, AND MOLDED ARTICLE INCLUDING SAME

TECHNICAL FIELD

The present invention relates to a polyamide composition and a molded article of the polyamide composition.

BACKGROUND ART

As excellent in mechanical properties and moldability, a polyamide is used in various applications such as electric/electronic parts, automobile parts, machine parts, industrial components, fibers, films and sheets. In particular, for use for electric/electronic parts, high-level flame retardancy based on UL-94 Standard is required, and therefore a method of flameproofing a polyamide composition using various kinds of flame retardant is proposed.

For example, PTL 1 proposes a polyamide composition containing a specific polyamide, specific glass fibers and a bromine-based flame retardant, saying that the composition is excellent in fluidity.

PTLs 2 and 3 propose a flame-retardant polyamide resin composition containing a polyamide whose terminal amino group ratio or terminal carboxy group ratio falls within a specific range, a bromopolystyrene, and a copolymer of an aromatic vinyl compound and an α,β-unsaturated dicarboxylic anhydride, saying that the composition is excellent in flame retardancy, extrusion workability and molding workability of thin-walled articles thereof.

PTL 4 proposes a polyamide composition containing a polyamide whose melting point falls within a specific range, a flame retardant and a drip preventing agent, wherein, as the drip preventing agent, a fluororesin and at least one polymer selected from the group consisting of an ionomer and a modified aromatic vinyl polymer are used in a ratio by mass falling within a specific range, saying that the composition is excellent in flame retardancy, heat resistance and moldability (fluidity) favorable for a material for molding electronic parts having a thin-walled portion.

CITATION LIST

Patent Literature

PTL 1: JP 2003-82228 A
PTL 2: JP 2007-291249 A
PTL 3: JP 2007-291250 A
PTL 4: WO2009/017043

SUMMARY OF INVENTION

Technical Problem

Here, in packaging electric/electronic parts, higher-level flame retardancy of thin-walled parts is required along with the tendency toward down-sized and thin-walled parts as associated with requirements for down-sizing and weight-saving solution for product sizes. In electric/electronic parts requiring reflow soldering heat resistance along with recent progress of surface-mount technology (SMT), and in automobile parts that are in an increasing demand for heat resistance thereof, further improvement of heat resistance and moldability of a polyamide composition is desired. However, the techniques of PTLs 1 to 3 are not sufficiently satisfactory in high-level flame retardancy, heat resistance and moldability of thin-walled parts. The technique of PTL 4 can improve flame retardancy, heat resistance and moldability, for which, however, further performance improvement is desired.

In consideration of the above situations, an object of the present invention is to provide a polyamide composition having high-level flame retardancy in thin-walled structures and having excellent heat resistance and moldability, and to provide a molded article of the polyamide composition.

Solution to Problem

The present inventors have found that a polyamide composition containing a polyamide having a specific melting point and a flame retardant, which is such that the flow length thereof under a specific injection condition is a predetermined value or more and the melt flow rate thereof measured under a specific condition is a predetermined value or less, can solve the above-mentioned problems and have completed the present invention as a result of assiduous studies further made on the basis of the finding.

Specifically, the present invention relates to the following [1] to [14].

[1] A polyamide composition containing a polyamide (A) having a melting point of 280° C. or higher and a flame retardant (B), which is such that, when a melt of the polyamide composition is injection-molded with a mold having a thickness of 0.5 mm and a width of 40 mm under the condition of a cylinder temperature higher by 20° C. than the melting point of the polyamide (A), an injection pressure of 74 MPa and a mold temperature of 140° C., the flow length is 40 mm or more, and that the melt flow rate at a temperature of 320° C. and under a load of 2.16 kg is 15 g/10 min or less.

[2] The polyamide composition according to [1] further containing an aromatic vinyl copolymer (C), wherein the aromatic vinyl copolymer (C) contains a structural unit derived from an aromatic vinyl, and a structural unit derived from an α,β-unsaturated dicarboxylic anhydride.

[3] The polyamide composition according to [2], wherein the glass transition temperature of the aromatic vinyl copolymer (C) is 140° C. or higher.

[4] The polyamide composition according to [2] or [3], wherein the content of the α,β-unsaturated dicarboxylic anhydride-derived structural unit in the aromatic vinyl copolymer (C) is from 18 to 50% by mass.

[5] The polyamide composition according to any of [1] to [4], wherein the aromatic vinyl-derived structural unit contains a structural unit derived from at least one selected from the group consisting of styrene and α-methylstyrene.

[6] The polyamide composition according to any of [1] to [5], wherein the α,β-unsaturated dicarboxylic anhydride-derived structural unit contains a structural unit derived from at least one selected from the group consisting of maleic anhydride and a monoalkyl-maleic anhydride having an alkyl group having 1 or more and 3 or less carbon atoms.

[7] The polyamide composition according to any of [1] to [6], wherein the polyamide (A) is a semi-aromatic polyamide.

[8] The polyamide composition according to [7], wherein, in the semi-aromatic polyamide, more than 50 mol % of the structural unit derived from the dicarboxylic acid that constitutes the semi-aromatic polyamide is a structural unit derived from an aromatic dicarboxylic acid, and more than 50 mol % of the structural unit derived from the diamine that constitutes the semi-aromatic polyamide is a structural unit derived from an aliphatic diamine having 4 to 18 carbon atoms.

[9] The polyamide composition according to [8], wherein the aliphatic diamine is at least one selected from the group consisting of 1,6-hexanediamine, 1,9-nonanediamine, 2-methyl-1,8-octanediamine, and 1,10-decanediamine.

[10] The polyamide composition according to any of [1] to [9], wherein the flame retardant (B) is a bromine-based flame retardant.

[11] The polyamide composition according to any of [1] to [10], further containing a filler (D).

[12] The polyamide composition according to any of [1] to [10], wherein the polyamide composition is prepared by melt-kneading the polyamide (A), the flame retardant (B) and the aromatic vinyl copolymer (C).

[13] The polyamide composition according to [11], wherein the polyamide composition is prepared by melt-kneading the polyamide (A), the flame retardant (B), the aromatic vinyl copolymer (C) and the filler (D).

[14] A molded article of the polyamide composition of any of [1] to [13].

Advantageous Effects of Invention

According to the present invention, there can be provided a polyamide composition having high-level flame retardancy in thin-walled structures and having excellent heat resistance and moldability, and a molded article of the polyamide composition.

DESCRIPTION OF EMBODIMENTS

Polyamide Composition

The polyamide composition of the present invention contains a polyamide (A) having a melting point of 280° C. or higher and a flame retardant (B). The polyamide composition is such that, when a melt of the polyamide composition is injection-molded with a mold having a thickness of 0.5 mm and a width of 40 mm under the condition of a cylinder temperature higher by 20° C. than the melting point of the polyamide (A), an injection pressure of 74 MPa and a mold temperature of 140° C., the flow length is 40 mm or more, and that the melt flow rate at a temperature of 320° C. and under a load of 2.16 kg is 15 g/10 min or less.

The polyamide composition of the present invention has high-level flame retardancy in thin-walled structures and has excellent heat resistance and moldability.

The polyamide (A) in the present invention has a melting point of 280° C. or higher, and therefore secures improved heat resistance. In a vertical flame test of UL-Standard used for evaluation of flame retardancy, a sufficient melt tension in vertical combustion is desired. However, in evaluation of flame retardancy of thin-walled structures, a polyamide composition capable of expressing a higher melt tension in vertical combustion is desired since thin-walled test pieces are tested. On the other hand, when a melt tension is desired to be increased, there occurs a problem of worsening of moldability. In the present invention, the polyamide composition is so controlled that the flow length under a specific injection condition is a predetermined value or more, and accordingly, it is considered that, in molding, the composition can have a low viscosity to maintain excellent moldability, while on the other hand, the melt flow rate of the composition as measured under a specific condition is controlled to be a predetermined value or less, whereby the composition can have a high viscosity at a low shear rate to achieve improved flame retardancy.

Polyamide (A)

The polyamide composition of the present invention contains a polyamide (A) having a melting point of 280° C. or higher.

The polyamide (A) includes a polycondensate of a dicarboxylic acid and a diamine, a ring-opened polymer of a cyclic lactam, and a polycondensate of an aminocarboxylic acid.

In this description, "XXX unit" (here "XXX" represents a monomer" means "a structural unit derived from XXX" and, for example, "a dicarboxylic acid unit" means "a structural unit derived from a dicarboxylic acid" and "a diamine unit" means "a structural unit derived from a diamine".

Examples of the dicarboxylic acid include an aliphatic dicarboxylic acid such as malonic acid, succinic acid, glutaric acid, adipic acid, pimelic acid, suberic acid, azelaic acid, sebacic acid, undecanedioic acid, dodecanedioic acid, dimethylmalonic acid, 2,2-diethylsuccinic acid, 2,2-dimethylglutaric acid, 2-methyladipic acid, and trimethyladipic acid; an alicyclic dicarboxylic acid such as 1,3-cyclopentanedicarboxylic acid, 1,3-cyclohexanedicarboxylic acid, 1,4-cyclohexanedicarboxylic acid, cycloheptanedicarboxylic acid, cyclooctanedicarboxylic acid, and cyclodecanedicarboxylic acid; and an aromatic dicarboxylic acid such as terephthalic acid, isophthalic acid, phthalic acid, 2,6-naphthalenedicarboxylic acid, 2,7-naphthalenedicarboxylic acid, 1,4-naphthalenedicarboxylic acid, 1,4-phenylenedioxy-diacetic acid, 1,3-phenylenedioxy-diacetic acid, diphenic acid, diphenylmethane-4,4'-dicarboxylic acid, diphenylsulfone-4,4'-dicarboxylic acid, and 4,4'-biphenyldicarboxylic acid. One alone or two or more kinds of these dicarboxylic acids can be used either singly or as combined.

Within a range not detracting from the advantageous effects of the present invention, the polyamide (A) may further contain a structural unit derived from a tribasic or higher polycarboxylic acid such as trimellitic acid, trimesic acid or pyromellitic acid within a melt-moldable range.

The diamine includes an aliphatic diamine, an alicyclic diamine and an aromatic diamine. The aliphatic diamine includes a linear aliphatic diamine such as ethylenediamine, 1,2-propanediamine, 1,3-propanediamine, 1,4-butanediamine, 1,5-pentanediamine, 1,6-hexanediamine, 1,7-heptanediamine, 1,8-octanediamine, 1,9-nonanediamine, 1,10-decanediamine, 1,11-undecanediamine, and, and 1,12-dodecanediamine; and a branched aliphatic diamine such as 1-butyl-1,2-ethanediamine, 1,1-dimethyl-1,4-butanediamine, 1-ethyl-1,4-butanediamine, 1,2-dimethyl-1,4-butanediamine, 1,3-dimethyl-1,4-butanediamine, 1,4-dimethyl-1,4-butanediamine, 2,3-dimethyl-1,4-butanediamine, 2-methyl-1,5-pentanediamine, 3-methyl-1,5-pentanediamine, 2,5-dimethyl-1,6-hexanediamine, 2,4-dimethyl-1,6-hexanediamine, 3,3-dimethyl-1,6-hexanediamine, 2,2-dimethyl-1,6-hexanediamine, 2,2,4-trimethyl-1,6-hexanediamine, 2,4,4-trimethyl-1,6-hexanediamine, 2,4-diethyl-1,6-hexanediamine, 2,2-dimethyl-1,7-heptanediamine, 2,3-dimethyl-1,7-heptanediamine, 2,4-dimethyl-1,7-heptanediamine, 2,5-dimethyl-1,7-heptanediamine, 2-methyl-1,8-octanediamine, 3-methyl-1,8-octanediamine, 4-methyl-1,8-octanediamine, 1,3-dimethyl-1,8-octanediamine, 1,4-dimethyl-1,8-octanediamine, 2,4-dimethyl-1,8-octanediamine, 3,4-dimethyl-1,8-octanediamine, 4,5-dimethyl-1,8-octanediamine, 2,2-dimethyl-1,8-octanediamine, 3,3-dimethyl-1,8-octanediamine, 4,4-dimethyl-1,8-octanediamine, and 5-methyl-1,9-nonanediamine.

The alicyclic diamine includes cyclohexanediamine, methylcyclohexanediamine, isophoronediamine, norbornane-dimethylamine, and tricyclodecane-dimethylamine.

The aromatic diamine includes p-phenylenediamine, m-phenylenediamine, p-xylylenediamine, m-xylylenediamine, 4,4'-diaminodiphenylmethane, 4,4'-diaminodiphenyl sulfone, and 4,4'-diaminodiphenyl ether.

One alone or two or more kinds of these diamines may be used either singly or as combined.

Within a range not detracting from the advantageous effects of the present invention and within a melt-moldable range, the polyamide (A) may further contain a structural unit derived from a trihydric or higher polyamine such as bis(hexamethylene)triamine.

The cyclic lactam includes acetolactam, propiolactam, butyrolactam, valerolactam, caprolactam, enanthlactam, caprolactam, pelargolactam, caprinolactam, and laurolactam.

The aminocarboxylic acid includes aminopropionic acid, aminobutyric acid, aminovaleric acid, aminocaproic acid, aminoenanthic acid, aminocaprylic acid, aminopelargonic acid, aminocaproic acid, and aminolauric acid.

Preferably, the polyamide (A) is used as an aliphatic polyamide, a wholly aromatic polyamide or a semi-aromatic polyamide by appropriately combining monomers such as the above-mentioned dicarboxylic acid, diamine, cyclic lactam, aminocarboxylic acid, tribasic or higher polycarboxylic acid and a trihydric or higher polyamine so as to have a melting point of 280° C. or higher.

In the present invention, "wholly aromatic polyamide" is a polyamide in which more than 50 mol % of the dicarboxylic acid unit to constitute the polyamide is an aromatic dicarboxylic acid unit and more than 50 mol % of the diamine unit to constitute the polyamide is an aromatic diamine unit.

Also in the present invention, "semi-aromatic polyamide" is a polyamide in which more than 50 mol % of the dicarboxylic acid unit to constitute the polyamide is an aromatic dicarboxylic acid unit and more than 50 mol % of the diamine unit to constitute the polyamide is an aliphatic diamine unit, or a polyamide in which more than 50 mol % of the dicarboxylic acid unit to constitute the polyamide is an aliphatic dicarboxylic acid unit and more than 50 mol % of the diamine unit to constitute the polyamide is an aromatic diamine unit.

Among these, from the viewpoint of flame retardancy in thin-walled structures, heat resistance and moldability, at least one selected from the group consisting an aliphatic polyamide and a semi-aromatic polyamide is preferred, and a semi-aromatic polyamide is more preferred.

The aliphatic polyamide includes a ring-opened polymer of the above-mentioned cyclic lactam, a polycondensate of the above-mentioned aminocarboxylic acid, and a polycondensate of the above-mentioned aliphatic dicarboxylic acid and the above-mentioned aliphatic diamine. Above all, from the viewpoint of flame retardancy in thin-walled structures, heat resistance and moldability, a polycondensate of the above-mentioned aliphatic dicarboxylic acid and the above-mentioned aliphatic diamine is preferred, and from the viewpoint of easiness in production, polyamide 46 is more preferred.

The semi-aromatic polyamide is, from the viewpoint of flame retardancy in thin-walled structures, heat resistance and moldability, preferably such that more than 50 mol % of the dicarboxylic acid unit to constitute the semi-aromatic polyamide is an aromatic dicarboxylic acid and more than 50 mol % of the diamine unit to constitute the semi-aromatic polyamide is an aliphatic diamine unit.

The aromatic dicarboxylic acid to constitute the semi-aromatic polyamide includes the above-mentioned aromatic dicarboxylic acid. Above all, phthalic acid, isophthalic acid and terephthalic acid are preferred, isophthalic acid and terephthalic acid are more preferred, and terephthalic acid is even more preferred. The content of the aromatic dicarboxylic acid unit in all the dicarboxylic acid units to constitute the semi-aromatic polyamide is, from the viewpoint heat resistance, preferably 60 mol % or more, more preferably 70 mol % or more, even more preferably 80 mol % or more, further more preferably 90 mol % or more, and is 100 mol % or less.

The semi-aromatic polyamide may contain any other dicarboxylic acid unit than the aromatic dicarboxylic acid unit. The other dicarboxylic acid includes the above-mentioned aliphatic dicarboxylic acid and alicyclic dicarboxylic acid. The content of the other dicarboxylic acid unit in all the dicarboxylic acid units to constitute the semi-aromatic polyamide is preferably 40 mol % or less, more preferably 30 mol % or less, even more preferably 20 mol % or less, further more preferably 10 mol % or less.

The aliphatic diamine to constitute the semi-aromatic polyamide includes the above-mentioned aliphatic diamine. The carbon number of the aliphatic diamine is, from the viewpoint of excellent properties such as heat resistance and low water absorption performance, preferably 4 or more, more preferably 6 or more, even more preferably 8 or more, and is preferably 18 or less, more preferably 12 or less.

The aliphatic diamine is, from the viewpoint of excellent properties such as heat resistance and low water absorption performance, preferably at least one selected from the group consisting of 1,6-hexanediamine, 1,9-nonanediamine, 2-methyl-1,8-octanediamine, and 1,10-decanediamine, more preferably at least one selected from the group consisting of 1,9-nonanediamine and 2-methyl-1,8-octanediamine, and even more preferably combined use of 1,9-nonanediamine and 2-methyl-1,8-octanediamine.

The content of the aliphatic diamine unit in all the diamine units to constitute the semi-aromatic polyamide is preferably 60 mol % or more, more preferably 70 mol % or more, even more preferably 80 mol % or more, further more preferably 90 mol % or more, and is 100 mol % or less.

The semi-aromatic polyamide may contain any other diamine unit than the aliphatic diamine unit. The other diamine includes the above-mentioned aromatic diamine and alicyclic diamine. The content of the other diamine unit in all the diamine units to constitute the semi-aromatic polyamide is preferably 40 mol % or less, more preferably 30 mol % or less, even more preferably 20 mol % or less, further more preferably 10 mol % or less.

In the case where 1,9-nonanediamine and 2-methyl-1,8-octanediamine are combined and used as the aliphatic diamine, the molar ratio of 1,9-nonanediamine to 2-methyl-1,8-octanediamine (1,9-nonanediamine/2-methyl-1,8-octanediamine) is, from the viewpoint of heat resistance, preferably within a range of 95/5 to 40/60, more preferably within a range of 90/10 to 50/50, even more preferably within a range of 90/10 to 60/40.

The semi-aromatic polyamide may contain a structural unit derived from a cyclic lactam and/or an aminocarboxylic acid. Examples of the structural unit include structural units derived from a cyclic lactam such as caprolactam or laurolactam; and an aminocarboxylic acid such as 11-aminoundecanoic acid or 12-aminododecanoic acid. The total content of the cyclic lactam unit and the aminocarboxylic acid unit in the semi-aromatic polyamide is preferably 40 mol % or less relative to 100 mol % of the total of the dicarboxylic acid unit and the diamine; unit to constitute the semi-aromatic polyamide, more preferably 20 mol % or less.

Specifically, the semi-aromatic polyamide includes polytetramethylene terephthalamide (polyamide 4T), polyhexamethylene terephthalamide (polyamide 6T), polynonamethylene terephthalamide (polyamide 9T), polydecamethylene terephthalamide (polyamide 10T), polyhexamethylene isophthalamide (polyamide 6I), copolymer of polyamide 6I and polyamide 6T (polyamide 6I/6T), and copolymer of polyamide 6T and polyundecanamide (polyamide 11) (polyamide 6T/11). Above all, at least one selected from the group consisting of polyamide 4T, polyamide 6T, polyamide 9T and polyamide 10T is preferred, and at least one selected from the group consisting of polyamide 9T and polyamide 10T is more preferred, and polyamide 9T is even more preferred.

Preferably, the polyamide (A) for use in the present invention is blocked with a terminal-blocking agent at 10% or more of the terminal group of the molecular chain thereof. Preferably, the proportion of the terminal group of the molecular chain blocked with a terminal-blocking agent (terminal blocking ratio) is 20% or more.

As the terminal-blocking agent, a monofunctional compound having reactivity with the terminal amino group or carboxy group of polyamide, and from the viewpoint of reactivity and stability of blocked terminals, a monocarboxylic acid or a monoamine is preferred, and from the viewpoint of easy handleability, a monocarboxylic acid is more preferred. In addition, monoisocyanates, monoacid halides, monoesters and monoalcohols are also usable as a terminal-blocking agent.

As the monocarboxylic acid usable as a terminal-blocking agent, one having reactivity with an amino group can be used, and examples thereof include an aliphatic monocarboxylic acid such as acetic acid, propionic acid, butyric acid, valeric acid, caproic acid, caprylic acid, lauric acid, tridecanoic acid, myristic acid, palmitic acid, stearic acid, pivalic acid, and isobutyric acid; an alicyclic monocarboxylic acid such as cyclohexanecarboxylic acid; an aromatic monocarboxylic acid such as benzoic acid, toluic acid, α-naphthalenecarboxylic acid, β-naphthalenecarboxylic acid, methylnaphthalene-carboxylic acid, and phenylacetic acid; and an arbitrary mixture of these. Above all, from the viewpoint of reactivity, stability of blocked terminals and cost, acetic acid, propionic acid, butyric acid, valeric acid, caproic acid, caprylic acid, lauric acid, tridecanoic acid, myristic acid, palmitic acid, stearic acid and benzoic acid are preferred.

As the monoamine usable as a terminal-blocking agent, one having reactivity with a carboxy group can be used, and examples thereof include an aliphatic monoamine such as methylamine, ethylamine, propylamine, butylamine, hexylamine, octylamine, decylamine, stearylamine, dimethylamine, diethylamine, dipropylamine, and dibutylamine; an alicyclic monoamine such as cyclohexylamine and dicyclohexylamine; an aromatic monoamine such as aniline, toluidine, diphenylamine, and naphthylamine; and an arbitrary mixture of these. Above all, from the viewpoint of reactivity, boiling point, stability of blocked terminals and cost, preferred are butylamine, hexylamine, octylamine, decylamine, stearylamine, cyclohexylamine and aniline.

The terminal blocking ratio of the polyamide (A) is determined by measuring the number of the carboxy group terminals, the amino group terminals and the terminal groups blocked with a terminal-blocking agent, and according to the following expression (1). Preferably and from the viewpoint of accuracy and simplicity, the number of each terminal groups is determined from the value of integral of the specific signal corresponding to each terminal in $^1$H-NMR.

$$\text{Terminal Blocking Ratio (\%)}=[(T-S)/T]\times 100 \quad (1)$$

wherein T represents a total number of the terminal groups of the molecular chain of the polyamide (A) (generally, this is the same as two times the number of the polyamide molecule), and S represents a total number of the carboxyl group terminals and the amino group terminals having remained without being blocked.

The polyamide (A) for use in the present invention can be produced according to an arbitrary method known as a method for producing a crystalline polyamide. For example, the polyamide can be produced according to a solution polymerization method or an interfacial polymerization method using a dicarboxylic acid in an acid chloride form and a diamine as starting materials, or a melt polymerization method, a solid-phase polymerization method or a melt extrusion polymerization method using a dicarboxylic acid and a diamine as raw materials.

For example, the polyamide (A) can be produced according to a method where a diamine, a dicarboxylic acid and optionally a catalyst and a terminal-blocking agent are put in a reactor all at a time to prepare a nylon salt, then this is thermally polymerized at a temperature of 200 to 250° C. to give a prepolymer, and further this is polymerized in a solid phase or polymerized using a melt extruder to give the intended polyamide. In the case where the final stage of polymerization is carried out in a mode of solid-phase polymerization, preferably, the reaction is carried out under reduced pressure or in an inert gas flow, and when the polymerization temperature falls within a range of 200 to 280° C., the polymerization rate can be great, the productivity is excellent and discoloration and gelation can be effectively suppressed. The polymerization temperature in the case of carrying out the final stage of polymerization using a melt extruder is preferably 370° C. or lower, and under the condition, little degradation occurs during the polymerization and a polyamide (A) degraded little can be produced.

Examples of the catalyst usable in producing the polyamide (A) includes phosphoric acid, phosphorus acid, hypophosphorous acid, and salts or esters thereof. The salts or esters include salts of phosphoric acid, phosphorous acid or hypophosphorous acid with a metal such as potassium, sodium, magnesium, vanadium, calcium, zinc, cobalt, manganese, tin, tungsten, germanium, titanium or antimony; ammonium salts of phosphoric acid, phosphorous acid or hypophosphorous acid; and ethyl esters, isopropyl esters, butyl esters, hexyl esters, isodecyl esters, octadecyl esters, decyl esters, stearyl esters and phenyl esters of phosphoric acid, phosphorous acid or hypophosphorous acid. Above all, sodium hypophosphite monohydrate or phosphorus acid is preferred.

Preferably, the polyamide (A) has a limiting viscosity [η], as measured using concentrated sulfuric acid as a solvent under the condition of 30° C., of 0.60 to 1.2 dl/g, more preferably 0.65 to 1.1 dl/g. When the polyamide (A) having a limiting viscosity [η] of 0.60 dl/g or more is used, the resultant molded article can have good mechanical properties. When the polyamide (A) having a limiting viscosity [η] of 1.2 dl/g or less is used, the moldability betters.

The limiting viscosity [η] of the polyamide (A) is measured according to the method described in the section of Examples.

The melting point of the polyamide (A) is, from the viewpoint of heat resistance and additionally from the viewpoint of more remarkably exhibiting the advantageous effects of the present invention, preferably 280° C. or higher, more preferably 290° C. or higher, even more preferably 300° C. or higher, and is, from the viewpoint of preventing thermal degradation of the polyamide in melt molding, preferably 350° C. or less, more preferably 340° C. or less, even more preferably 330° C. or less.

The melting point of the polyamide (A) is measured according to the method described in the section of Examples.

Flame Retardant (B)

The polyamide composition of the present invention contains a flame retardant (B).

The flame retardant (B) includes a phosphorus-based flame retardant and a halogen-based flame retardant such as a bromine-based flame retardant and a chlorine-based flame retardant.

The phosphorus-based flame retardant includes red phosphorus; an aliphatic phosphate such as trimethyl phosphate, and triethyl phosphate; an aromatic phosphate such as triphenyl phosphate, tricresyl phosphate, trixylenyl phosphate, cresyl diphenyl phosphate, cresyl di-2,6-xylenyl phosphate, tris(t-butylated phenyl) phosphate, tris (i-propylated phenyl) phosphate, and 2-ethylhexyl diphenyl phosphate; a halogen-containing phosphate such as tris(dichloropropyl) phosphate, tris (β-chloropropyl) phosphate, tris (chloroethyl) phosphate, and tris(tribromoneopentyl) phosphate; an aromatic condensed phosphate such as 1,3-phenylenebis(diphenyl phosphate), 1,3-phenylenebis(dixylenyl) phosphate, and bisphenol A bis(diphenyl phosphate); a halogen-containing condensed phosphate such as 2,2-bis(chloromethyl)trimethylenebis(bis(2-chloroethyl) phosphate), and polyoxyalkylenebis-dichloroalkyl phosphate; a phosphoric acid amide; a phosphate salt such as ammonium polyphosphate, and melamine polyphosphate; and a phosphazene compound.

The chlorine-based flame retardant includes chlorinated paraffin, chlorinated polyethylene, dodecachloropentacyclooctadeca-7,15-diene (trade name "Dechlorane Plus 25", from Occidental Chemical Asia, Limited), and Het anhydride.

The bromine-based flame retardant includes a brominated polystyrene (also may be polystyrene bromide); a brominated polyphenylene oxide; a brominated bisphenol-type epoxy polymer; a brominated styrene-maleic anhydride polymer; a brominated epoxy resin; a brominated phenoxy resin; a brominated polybenzyl (meth)acrylate such as polypentabromobenzyl acrylate; a bromine-containing polycyclic compound such as bis(pentabromophenyl)ethane, 1,2-bis(2,4,6-tribromophenoxy)ethane, 2,4,6-tris(2,4,6-tribromophenoxy)-1,3,5-triazine, 2,6-dibromophenol, 2,4-dibromophenol, and polybromophenylindane; tetrabromobisphenol A and a derivative thereof, such as tetrabromobisphenol A, tetrabromobisphenol A-bis(dibromopropyl ether), tetrabromobisphenol A-bis(aryl ether), tetrabromobisphenol A polycarbonate, and tetrabromobisphenol A epoxy oligomer; tetrabromobisphenol S and a derivative thereof, such as tetrabromobisphenol S, and tetrabromobisphenol S-bis(dibromopropyl ether); a polybrominated diphenyl ether such as decabromodiphenyl ether, and octabromodiphenyl ether; a polybrominated biphenyl such as decabromobiphenyl; brominated polycarbonate; a bromine-containing cycloaliphatic compound such as hexabromocyclododecane; a brominated crosslinked aromatic polymer; a bromine-containing phthalic acid compound such as tetrabromophthalic anhydride, and N,N-ethylenebis(tetrabromophthal)imide; and a bromine-containing isocyanuric acid compound such as tris(pentabromobenzyl) isocyanurate, and tris(dibromopropyl) isocyanurate. One alone or two or more kinds of these flame retardants can be used either singly or as combined. Preferably, the content of the bromine atom in the bromine-based flame retardant is 15 to 87% by mass.

The flame retardant (B) is, from the viewpoint of flame retardancy in thin-walled structures, heat resistance and moldability, preferably at least one selected from the group consisting of a phosphorus-based flame retardant and a bromine-based flame retardant, more preferably a bromine-based flame retardant.

The bromine-based flame retardant is preferably at least one selected from the group consisting of a brominated polystyrene, a brominated polyphenylene oxide, a brominated epoxy resin, a brominated polybenzyl (meth) acrylate, a bromine-containing polycyclic compound, tetrabromobisphenol A and a derivative thereof, tetrabromobisphenol S and a derivative thereof, a polybrominated diphenyl ether, a bromine-containing cycloaliphatic compound, a bromine-containing phthalic acid compound, and a bromine-containing isocyanuric acid compound, and more preferably at least one selected from the group consisting of a brominated polystyrene, a brominated polyp henylene oxide, a brominated epoxy resin, polypentabromobenzyl acrylate, bis (pentabromophenyl)ethane, 2,4,6-tris(2,4,6-tribromophenoxy)-1,3,5-triazine, polybromophenylindane, tetrabromobisphenol A-bis(dibromopropyl ether), tetrabromobisphenol A polycarbonate, tetrabromobisphenol S-bis(dibromopropyl ether), decabromodiphenyl ether, hexabromocyclododecane, N,N-ethylenebis(tetrabromophthal)imide, and tris(dibromopropyl) isocyanurate. Above all, from the viewpoint of resistance to high-temperature molding, at least one selected from the group consisting of a brominated polystyrene, a brominated epoxy resin and N,N-ethylenebis(tetrabromophthal)imide is more preferred, and a brominated polystyrene is even more preferred.

A method for producing the brominated polystyrene is not specifically limited, and for example, it can be produced according to a method where styrene is polymerized to give a polystyrene, and then the benzene ring of the polystyrene is brominated, or a method of polymerizing a brominated styrene (bromostyrene, dibromostyrene, or tribromostyrene).

The content of the bromine atom in the brominated polystyrene is preferably 55 to 75% by mass. When the bromine atom content is 55% by mass or more, the amount of the brominated polystyrene enough to satisfy the bromine amount necessary for flame retardation can be reduced, and high-level flame retardancy in thin-walled structures can be given without worsening mechanical properties and heat resistance. In addition, when the bromine atom content is 75% by mass or less, reduction in the thermal stability of the brominated polystyrene and thermal decomposition thereof in melt molding can be suppressed, and therefore gas generation can also be suppressed to inhibit discoloration by heat.

Flame Retardation Aid

The polyamide composition of the present invention preferably contains a flame retardation aid in addition to the above-mentioned bromine-based flame retardant, from the viewpoint of achieving excellent flame retardancy in thin-walled structures using a small amount of the flame retardant. Examples of the flame retardation aid include antimony trioxide, antimony pentoxide, sodium antimonite, sodium oxide, tin oxide, zinc stannate, zinc oxide, iron oxide, magnesium hydroxide, calcium hydroxide, zinc borate, kaolin clay, and calcium carbonate. One alone or two or more kinds of these flame retardation aids can be used either singly or as combined. The flame retardation aid may be treated with a silane coupling agent or a titanium coupling agent. Above all, zinc borate and zinc stannate are preferred, and zinc stannate is more preferred.

Aromatic Vinyl Copolymer (C)

From the viewpoint of flame retardancy in thin-walled structures, heat resistance and moldability, the polyamide composition of the present invention preferably contains an aromatic vinyl copolymer (C) (hereinafter also referred to as "copolymer (C)"). Also from the viewpoint of flame retardancy in thin-walled structures, heat resistance and moldability, the copolymer (C) preferably contains an aromatic vinyl unit and an $\alpha,\beta$-unsaturated dicarboxylic anhydride unit.

Such an aromatic vinyl is a compound having an aromatic ring and a vinyl group, and examples thereof include styrene, 2-methylstyrene, $\alpha$-methylstyrene, and p-methylstyrene. Above all, styrene and $\alpha$-methylstyrene are preferred, and styrene is more preferred.

The $\alpha,\beta$-unsaturated dicarboxylic anhydride includes maleic anhydride, a monoalkylmaleic anhydride having an alkyl group having 1 or more and 3 or less carbon atoms, and a dialkylmaleic anhydride having alkyl groups each having 1 or more and 3 or less carbon atoms. Above all, at least one selected from the group consisting of maleic anhydride and a monoalkylmaleic anhydride is preferred, at least one selected from the group consisting of maleic anhydride and citraconic anhydride is more preferred, and maleic anhydride is even more preferred.

The content of the $\alpha,\beta$-unsaturated dicarboxylic anhydride unit in the copolymer (C) is preferably 18 to 50% by mass. When the content of the $\alpha,\beta$-unsaturated dicarboxylic anhydride unit is 18% by mass or more, the $\alpha,\beta$-unsaturated dicarboxylic anhydride unit in the copolymer (C) can react with the carboxy group terminal or the amino group terminal in the polyamide (A), and accordingly the viscosity of the polyamide composition is thereby increased and the melt tension thereof is also increased to prevent the composition from dripping. Further, since the carboxy group terminal amount is reduced through the reaction, the polyamide (A) can be prevented from being decomposed at high temperatures. As a result, the flame retardancy in thin-walled structures of the composition can also be improved. When the content of the $\alpha,\beta$-unsaturated dicarboxylic anhydride unit is 50% by mass or less, the viscosity of the polyamide composition does not increase so much, and therefore the composition can satisfy both high-level flame retardancy in thin-walled structures and excellent moldability. From the viewpoints, the content of the $\alpha,\beta$-unsaturated dicarboxylic anhydride unit in the copolymer (C) is preferably 19% by mass or more, more preferably 20% by mass or more, and is preferably 40% by mass or less, more preferably 30% by mass or less, even preferably 28% by mass or less, especially more preferably 25% by mass or less.

The copolymer (C) may further contain any other structural unit than the aromatic vinyl unit and the $\alpha,\beta$-unsaturated dicarboxylic anhydride unit, but the total content of the aromatic vinyl unit and the $\alpha,\beta$-unsaturated dicarboxylic anhydride unit in the copolymer (C) is preferably 80% by mass or more, more preferably 90% by mass or more, and is further more preferably 100% by mass.

The glass transition temperature of the copolymer (C) is, from the viewpoint of flame retardancy in thin-walled structures and heat resistance, preferably 140° C. or higher, more preferably 145° C. or higher, even more preferably 150° C. or higher, and is, from the viewpoint of preventing thermal decomposition of the polyamide in melt molding, preferably 200° C. or lower, more preferably 180° C. or lower, even more preferably 160° C. or lower. The glass transition temperature of the copolymer (C) is measured according to the method described in the section of Examples.

The weight-average molecular weight (Mw) of the copolymer (C) is, from the viewpoint of flame retardancy in thin-walled structures and heat resistance, preferably 10,000 or more, more preferably 20,000 or more, even more preferably 30,000 or more, further more preferably 40,000 or more, especially more preferably 50,000 or more, and is preferably 500,000 or less, more preferably 400,000 or less, even more preferably 300,000 or less, especially more preferably 200,000 or less. Accordingly, the range of the weight-average molecular weight (Mw) of the copolymer (C) is preferably 10,000 to 500,000, more preferably 20,000 to 400,000, even more preferably 30,000 to 300,000, and most preferably 50,000 to 200,000. The weight-average molecular weight (Mw) is measured as a polystyrene-equivalent value according to gel permeation chromatography (GPC).

The copolymer (C) may be a commercially-available product, or may be one produced in a known method. The bonding mode between the aromatic vinyl unit and the $\alpha,\beta$-unsaturated dicarboxylic anhydride unit is not specifically limited, and may be any mode of random polymerization, block polymerization, or graft polymerization, but from the viewpoint of more remarkably achieving the advantageous effects of the present invention, a random polymerization or block polymerization mode is preferred, and the copolymer (C) is preferably one produced by reacting an aromatic vinyl and an $\alpha,\beta$-unsaturated dicarboxylic anhydride.

Commercial products of the copolymer (C) include DYLARK Series (trade name from NOVA Chemicals Corporation), and XIRAN Series (trade name from Polyscope Polymers B.V.).

Filler (D)

Preferably, the polyamide composition of the present invention further contains a filler (D) from the viewpoint of improving flame retardancy in thin-walled structures, heat resistance, moldability and mechanical strength.

The filler (D) usable here may have any shape of fibrous, tabular, acicular, powdery or cloth-like ones. Specifically, herein usable are a fibrous filler such as glass fibers, carbon fibers, aramid fibers, liquid-crystal polymer (LCP) fibers, gypsum fibers, brass fibers, ceramic fibers, and boron whisker fibers; an acicular a tabular filler such as glass flakes, mica, and talc; an acicular filler such as potassium titanate whiskers, aluminum borate whiskers, calcium carbonate whiskers, magnesium sulfate whiskers, wollastonite, sepiolite, xonotlite, and zinc oxide whiskers; a powdery filler such as silica, alumina, barium carbonate, aluminum magnesium carbonate, aluminum nitride, boron nitride, potassium titanate, titanium oxide, aluminum silicate (kaolin, clay, pyrophyllite, bentonite), calcium silicate, magnesium silicate (attapulgite), aluminum borate, calcium carbonate, barium sulfate, magnesium sulfate, asbestos, glass beads, carbon black, graphite, carbon nanotubes, silicon carbide, sericite, hydrotalcite, molybdenum disulfide, phenol resin particles, crosslinked styrene resin particles, and crosslinked acrylic resin particles; and a cloth-like filler such as glass cloth. One alone or two or more kinds of these may be used either singly or as combined.

The filler (D) may be surface-treated with a high-molecular compound such as a silane coupling agent, a titanium coupling agent, an acrylic resin, an urethane resin or an epoxy resin, or any other low-molecular compound, for the purpose of enhancing the dispersibility thereof in the polyamide (A) or for the purpose of enhancing the adhesiveness to the polyamide (A).

Among the filler (D), at least one selected from the group consisting of a fibrous filler and an acicular filler is preferred as inexpensive and as capable of giving molded articles having high mechanical strength. The filler (D) is, from the viewpoint of high strength and low cost, preferably glass fibers, and is, from the viewpoint of giving molded articles having high surface smoothness, preferably an acicular filler. The filler (D) is preferably at least one selected from the group consisting of glass fibers, wollastonite, potassium titanate whiskers, calcium carbonate whiskers and aluminum borate whiskers, more preferably at least one selected from the group consisting of glass fibers and wollastonite, even more preferably glass fibers.

The average fiber length of the glass fibers is preferably 1 to 10 mm, more preferably 1 to 7 mm, even more preferably 2 to 4 mm. The average fiber diameter of the glass fibers is, from the viewpoint of achieving mechanical strength, preferably 6 to 20 µm, more preferably 6 to 15 µm.

The average fiber length and the average fiber diameter of the glass fibers can be determined by measuring the fiber length and the fiber diameter of each of 400 glass fibers randomly selected in image analysis through electronic microscopy and then averaging the resultant data to give a weight-average value.

The average fiber length and the average fiber diameter of the glass fibers in the polyamide composition or in a molded article of the polyamide composition can be determined, for example, by dissolving the polyamide composition or the molded article in an organic solvent to extract the glass fibers followed by image analysis of the glass fibers through electronic microscopy in the same manner as above.

Other Components

As needed, the polyamide composition of the present invention may further contain any other component than those mentioned above, for example, a drip preventing agent such as a polytetrafluoroethylene powder; an antioxidant such as a phenol-based or phosphorus-based antioxidant; a mold release agent such as a polyolefin wax; a light stabilizer; a colorant; an antistatic agent; a crystal nucleating agent; a plasticizer; and a lubricant.

Content of Each Component in Polyamide Composition

The content of the polyamide (A) in the polyamide composition of the present invention is preferably 20 to 80% by mass. When the content of the polyamide (A) is 20% by mass or more, molding is easy and the heat resistance and the mechanical properties of the resultant molded article are good; and when the content is 80% by mass or less, the flame retardancy is good. From the viewpoints, the content of the polyamide resin (A) is more preferably 30 to 70% by mass, even more preferably 35 to 60% by mass.

The content of the flame retardant (B) in the polyamide composition of the present invention is preferably 1 to 100 parts by mass relative to 100 parts by mass of the polyamide (A). When the content of the flame retardant (B) is 1 part by mass or more, the flame retardancy improves; and when the content of the flame retardant (B) is 100 parts by mass or less, the mechanical properties of the resultant polyamide composition can be prevented from being worsened. From the viewpoints, the content of the flame retardant (B) is more preferably 5 to 90 parts by mass relative to 100 parts by mass of the polyamide (A), even more preferably 10 to 70 parts by mass, further more preferably 20 to 60 parts by mass, especially more preferably 30 to 55 parts by mass.

In the case where a flame retardation aid is used, the content of the flame retardation aid is preferably 0.1 to 50 parts by mass relative to 100 parts by mass of the polyamide (A), more preferably 1 to 30 parts by mass.

In the case where the polyamide composition of the present invention contains a copolymer (C), the content of the copolymer (C) in the polyamide composition is preferably within a range of 0.1 to 2.0% by mass relative to the total content of the polyamide (A), the flame retardant (B) and the copolymer (C). Here, the content of a constituent part of the copolymer (C) having reacted with the polyamide is added to the content of the copolymer (C) in the polyamide composition in calculating the content of the copolymer (C). When the content of the copolymer (C) is 0.1% by mass or more, the $\alpha,\beta$-unsaturated dicarboxylic anhydride unit in the copolymer (C) can react with the carboxy group terminal and the amino group terminal in the polyamide (A), and accordingly the viscosity of the polyamide composition is thereby increased and the melt tension thereof is also increased to prevent the composition from dripping. Further, since the carboxy group terminal amount is reduced through the reaction, the polyamide (A) can be prevented from being decomposed at high temperatures. As a result, the flame retardancy in thin-walled structures of the composition can also be improved. When the content of the copolymer (C) is 2.0% by mass or less, the viscosity of the polyamide composition does not increase so much, and therefore the composition can satisfy both high-level flame retardancy in thin-walled structures and excellent moldability. From the viewpoints, the content of copolymer (C) is preferably 0.2% by mass or more relative to the total content of the polyamide (A), the flame retardant (B) and the copolymer (C), more preferably 0.3% by mass or more, even more preferably 0.5% by mass or more, further more preferably 0.7% by mass or more, especially more preferably 1.0% by mass or more, most preferably 1.3% by mass or more, and is more preferably 1.8% by mass or less, even more preferably 1.7% by mass or less, further more preferably 1.6% by mass or less. The range of the content of the copolymer (C) is preferably 0.4 to 2.0% by mass, more preferably 0.5 to 1.8% by mass, even more preferably 0.6 to 1.8% by mass, further more preferably 0.7 to 1.7% by mass, further more preferably 1.0 to 1.7% by mass, most preferably 1.3 to 1.6% by mass.

The total content of the polyamide (A), the flame retardant (B) and the copolymer (C) in the polyamide composition of the present invention is not specifically limited, but is, from the viewpoint of flame retardancy in thin-walled structures, heat resistance and moldability, preferably 40% by mass or more, more preferably 50% by mass or more, even more preferably 60% by mass or more.

In the case where the polyamide composition of the present invention contains a filler (D), the content thereof is, from the viewpoint of achieving a molded article having high mechanical strength, preferably 1 to 100 parts by mass relative to 100 parts by mass of the polyamide (A), more preferably 5 to 90 parts by mass, even more preferably 10 to 80 parts by mass.

In the case where the above-mentioned other components are used, the content of the other components in the polyamide composition of the present invention is preferably 30% by mass or less, more preferably 20% by mass or less, even more preferably 10% by mass or less.

The polyamide composition of the present invention can be prepared by mixing the above-mentioned components according to a known method. More specifically, examples of the preparation method include a method of adding the components in polycondensation for the polyamide (A), a method of dry-blending the components with the polyamide (A), and a method of melt-kneading the components using an extruder. Among these, a method of melt-kneading the components using an extruder is preferred as the operation is easy and as a uniform composition can be prepared. The extruder to be used in the case is preferably a twin-screw extruder, and the melt-kneading temperature is, from the viewpoint of satisfying both dispersibility and prevention of resin degradation, preferably within a range falling between a temperature higher by 5° C. than the melting point of the polyamide (A) and 370° C. or lower, more preferably within a temperature range higher by 10° C. to 20° C. than the melting point. The shape of the polyamide composition is not specifically limited, and for example, the composition may be pellets.

The polyamide composition of the present invention has good moldability, and can be molded into a molded article according to a molding method generally employed for a thermoplastic resin composition, such as injection molding, extrusion molding, press forming, blow molding, calender molding or cast molding. The molding methods can be combined, and the combined molding method is also employable herein. In particular, from the viewpoint of easiness in molding, mass productivity and cost, injection molding is preferred. In addition, the polyamide composition of the present invention can be co-molded together with any other polymer. Further, the polyamide composition of the present invention can be complexed with a molded article of metal or with a cloth.

When the polyamide composition of the present invention is injection-molded using a mold having a thickness of 0.5 mm and a width of 40 mm under the condition of a cylinder temperature higher by 20° C. than the melting point of the polyamide (A), an injection pressure of 74 MPa and a mold temperature of 140° C., the flow length of the melt of the polyamide composition is 40 mm or more. In the case, both high flame retardancy in thin-walled structures and excellent moldability can be satisfied. From the viewpoint, the flow length is preferably 45 mm or more, more preferably 48 mm or more, even more preferably 50 mm or more, especially more preferably 53 mm or more, and is preferably 70 mm or less, more preferably 65 mm or less, even more preferably 60 mm or less, further more preferably 56 mm or less, and may also be 54 mm or less, or 52 mm or less. The range of the flow length is preferably 40 to 70 mm, more preferably 45 to 65 mm, even more preferably 48 to 60 mm, further more preferably 50 to 56 mm.

The flow length is an average value of data of the flow length Ln of 5 test pieces prepared under the above-mentioned condition and using a mold having a thickness of 0.5 mm and a width of 40 mm. Specifically, the flow length is measured according to the method described in the section of Examples.

The melt flow rate (MFR) at a temperature of 320° C. and under a load of 2.16 kg of the polyamide resin of the present invention is 15 g/10 min or less. In the case, both high flame retardancy in thin-walled structures and excellent moldability can be satisfied. From the viewpoint, the melt flow rate is preferably 1 to 13 g/10 min, more preferably 2 to 10 g/10 min, even more preferably 3 to 7 g/10 min. Specifically, MFR is measured according to the method described in the section of Examples.

Molded Article

The molded article of the present invention is formed of the polyamide composition of the present invention, and via the above-mentioned process, it can be used as various molded articles for electric/electronic parts, automobile parts, industrial components, fibers, films, sheets, household articles, and in any other arbitrary shapes and uses.

Examples of electric/electronic parts include connectors such as FPC connectors, B-to-B connectors, card connectors, SMT connectors (simultaneous multithreading connectors, etc.), and memory card connectors; SMT relays; SMT bobbins; sockets such as memory sockets, and CPU sockets; switches such as command switches, and SMT switches; optical parts such as optical fiber parts, and optical sensors; LED parts such as LED reflectors; and electronic substrates such as solar cell substrates, LED mounting boards, flexible print wiring boards, and resin molded circuit boards.

Examples of automobile parts include cooling parts such as thermostat housings, radiator tanks, radiator hoses, water outlets, water pump housings, and rear joints; intake and exhaust system parts such as intercooler tanks, intercooler cases, turbo duct pipes, EGR cooler cases, resonators, throttle bodies, intake manifolds, and tail pipes; fuel system parts such as fuel delivery pipes, gasoline tanks, quick connectors, canisters, pump modules, fuel pipelines, oil strainers, lock nuts, and sealing materials; structural parts such as mounting brackets, torque rods, and cylinder head covers; drive system parts such as bearing retainers, gear tensioners, head lamp actuator gears, slide door rollers, and clutch peripheral components; brake system parts such as air brake tubes; vehicle-mounted electrical components such as wire harness connectors in engine rooms, motor parts, sensors, ABS bobbins, combination switches, and vehicle-mounted switches; and interior and exterior parts such as slide door dampers, door mirror stays, door mirror brackets, inner mirror stays, roof rails, engine mounting brackets, inlayed pipes for air cleaners, door checkers, plastic chains, emblems, clips, breaker covers, cup holders, air bags, fenders, spoilers, radiator supports, radiator grills, louvers, air scoops, food bulges, back doors, and fuel sensor sender modules.

Examples of industrial components include gas pipes, pipes for oil field mining, hoses, terminate repelling cables (communication cables, pass cables, etc.), coating parts of powder-coated articles (inner coatings of water pipes, etc.), offshore oilfield pipes, pressure hoses, hydraulic tubes, painting tubes, fuel pumps, separators, super charger ducts, butterfly valves, conveyor roller bearings, railroad sleeper spring bearings, outboard engine covers, power generator engine covers, irrigation valves, large-sized switches, and monofilaments (extruded threads) for fishing nets.

Examples of fibers include air bag base fabrics, heat-resistant filters, reinforcing fibers, bristles for brushes, fishing lines, tire cords, artificial lawns, carpets, and fibers for seats.

Examples of films and sheets include heat-resistant pressure-sensitive adhesive tapes such as heat-resistant masking tapes, and industrial tapes; materials for magnetic tapes such as cassette tapes, data storing magnetic tapes for digital data storage, and video tapes; food packaging materials such as retort food pouches, individual packages for confectionery, and packages for processed food products; and electronic parts packaging materials such as materials for semiconductor packages.

Above all, the polyamide composition of the present invention can be favorable used for electric/electronic parts, as excellent in flame retardancy in thin-walled structures, heat resistance and moldability, and can be favorably used for electric/electronic parts including an SMT process, more specifically SMT-compliant connectors, SMT relays, SMT bobbins, sockets, command switches, and SMT switches.

EXAMPLES

Hereinunder the present invention is described more specifically with reference to Examples and Comparative Examples, but the present invention is not limited to the following Examples.

Evaluations in Examples and Comparative Examples were carried out according to the following methods.

Melting Point

Using a differential scanning calorimeter "DSC 822" from Mettler Toledo Corporation, a polyamide (A) was heated in a nitrogen atmosphere from 30° C. up to 360° C. at a rate of 10° C./min, and the peak temperature of the melting peak is referred to as the melting point (° C.) of the polyamide. When plural melting peaks appeared, the melting peak on the highest temperature side is the melting point.

Limiting Viscosity [η]

Using concentrated sulfuric acid (concentration: 98% by mass) as a solvent, concentrated acid solutions (sample solutions) of a polyamide (A) were prepared so as to have a solution concentration c of 0.05, 0.1, 0.2 and 0.4 g/dl individually. Using a Ubbelohde-type viscometer in a constant-temperature tank at 30° C., the flow time $t_0$ of the solvent and the flow time $t_1$ of each sample solution having a different concentration were measured. An inherent viscosity ($\eta_{inh}$) of each sample was calculated according to the following expression, and a value calculated by extrapolating the inherent viscosity ($\eta_{inh}$) into a concentration 0 is referred to as the limiting viscosity [η] of the tested polyamide (A).

$\eta_{inh}$ (dl/g)=[$ln(t_1/t_0)$]/c

In the expression, $t_0$ represents a flow time (sec) of the solvent, $t_1$ represents a flow time (sec) of each sample solution, and c represents each solution concentration (g/dl).

Glass Transition Temperature

The glass transition temperature of the copolymer (C) was measured according to the method of JIS K 7121:1987.

Flow Length

Using an injection-molding machine UH-1000 (clamp capacity 80 t) from Nissei Plastic Industrial Co., Ltd., five test pieces were produced one by one with a mold having a thickness of 0.5 mm and a width of 40 mm, under the condition of a cylinder temperature higher by 20° C. than the melting point of the polyamide (A), an injection pressure of 74 MPa and a mold temperature of 140° C. An average value of the flow length Ln of the produced five test pieces was calculated, and was referred to as the flow length of the polyamide composition.

Melt Flow Rate

According to JIS K 7210-1:2014, the amount (g/10 min) of a molten resin flowing out through a standard die (diameter 2.095 mm, length 8.000 mm) at a temperature of 320° C. and under a load of 2.16 kg was measured, and this was referred to as the melt flow rate of the polyamide composition.

Flame Retardancy

Flame retardancy was evaluated according to the stipulation of UL-94 Standard.

The polyamide composition produced in Examples and Comparative Examples was injection-molded (mold temperature: 140° C.) at a cylinder temperature higher by about 20° C. than the melting point of the polyamide therein to give test pieces each having a thickness of 0.3 mm, a width of 13 mm and a length of 125 mm. Next, the top edge of the test piece was clamped so as to vertically fix the test piece, then a predetermined flame was applied to the bottom edge for 10 seconds and separated to measure the burning time (first time) of the test piece. Immediately after extinguished, the flame was again applied to the bottom edge and separated to measure the burning time (second time) of the test piece. The same measurement was repeated for five test pieces to get five data of the first burning time and five data of the second burning time, totaling ten data. A total of the ten data is represented by T, and the maximum value of the ten data is represented by M. According to the following evaluation criteria, the sample was evaluated.

During exposure to flame, the sample was visually checked for presence or absence of drip.

Evaluation Criteria

V-0: T is 50 seconds or less, and M is 10 seconds or less. The sample did not burn up to the clamp, and even when the flamed melt dripped, a cotton put under the sample separated by 12 inches did not inflame.

V-1: T is 250 seconds or less, and M is 30 seconds or less. The sample did not burn up to the clamp, and even when the flamed melt dripped, a cotton put under the sample separated by 12 inches did not inflame.

V-2: T is 250 seconds or less, and M is 30 seconds or less. The sample did not burn up to the clamp, but when the flamed melt dripped, a cotton put under the sample separated by 12 inches inflamed.

Deformation Amount

The deformation amount of the length of the test pieces that had been tested for flame retardation evaluation was measured according to the following method. The test pieces that had dripped during the test for flame retardancy evaluation were excluded, and the length of n's test pieces not having dripped was measured before and after the test for flame retardancy evaluation, and the deformation amount was calculated according to the following expression. In the case where all the test pieces dripped, the deformation amount of the sample was expressed as "x". A smaller deformation amount means more excellent flame retardancy.

Deformation amount=[(total of lengths of *n*'s test pieces after flame retardancy evaluation test)− (total of lengths of *n*'s test pieces before flame retardancy evaluation test)]/*n*

Production Example 1 (Production of Polyamide PA1)

7882.0 g of terephthalic acid, 7742.9 g of a diamine mixture of 1,9-nonanediamine/2-methyl-1,8-octanediamine=85/15 (molar ratio), 280.8 g of benzoic acid as a terminal-blocking agent, 16.0 g of sodium hypophosphite monohydrate and 4 L of distilled water were put into an autoclave having an internal volume of 40 L, and purged with nitrogen. The internal temperature was elevated up to 200° C. taking 2 hours. At that time, the pressure in the autoclave increased up to 2 MPa. Subsequently this was reacted for 2 hours while the internal temperature was kept at 215° C. and while water vapor was gradually degassed to keep the pressure was at 2 MPa. Next, the pressure was lowered down to 1.2 MPa taking 30 minutes to give a prepolymer. The prepolymer was ground down to a size of 6 mm or less, and dried for 12 hours at 120° C. and under reduced pressure. This was polymerized in a solid phase under the condition of a temperature of 230° C. and a pressure of 13.3 Pa for 10 hours to give a polyamide PA1 having a melting point of 306° C. and a limiting viscosity [η] of 0.93 dl/g.

Examples 1 to 6, Comparative Examples 1 to 2

A polyamide (A), a flame retardant (B), a copolymer (C), a filler (D), a flame retardation aid and other components were formulated as in Table 1. The other components than the filler (D) were fed into a twin-screw extruder from Shibaura Machine Co., Ltd. (screw diameter 26 mmφ, L/D=46, rotation number 150 rpm, discharge rate 10 kg/h) through the most upstream hopper while the filler (D) was fed through the side feeder, and melt-kneaded at 320° C. The melt-kneaded polyamide composition was strand-like extruded out, then cooled and cut into pellets of the polyamide composition. The resultant pellets were formed into test pieces having a predetermined shape according to the above-mentioned method, and various properties thereof were evaluated. The results are shown in Table 1.

In Table 1, the components are as follows.

Polyamide (A)

Polyamide PA1 produced in Production Example 1

Flame Retardant (B)

Bromine-based flame retardant B1: trade name "Firemaster CP-44HF" from Chemtura Corporation (glycidyl methacrylate-modified polybrominated styrene)

Copolymer (C)

Copolymer C1: trade name "XIRAN SZ 23110" from Polyscope Corporation (styrene-maleic anhydride copolymer, content of maleic anhydride: 23% by mass, glass transition temperature: 150° C., weight-average molecular weight (Mw): 110,000)

Filler (D)

Filler D1: trade name "CS-3G-225S" from Nitto Boseki Co., Ltd. (glass fibers, cross-section profile: round, average fiber diameter: 9.5 μm, average fiber length: 3 mm)

Flame Retardation Aid

Flame retardation aid 1: trade name "Flamtard S" from Nippon Light Metal Co., Ltd. (zinc stannate)

Other Components

Drip preventing agent: trade name "640-J" from Chemours-Mitsui Fluoroproducts Co., Ltd. (polytetrafluoroethylene powder)
Antioxidant: trade name "Sumilizer GA-80" from Sumitomo Chemical Co., Ltd.
(3,9-bis{1,1-dimethyl-2-[β(3-t-butyl-4-hydroxy-5-methylphenyl)propionyloxy]ethyl}-2,4,8,10-tetraoxaspiro[5.5]undecane)
Mold release agent: trade name "Hi-Wax 200P" from Mitsi Chemicals, Inc. (polyolefin wax)
Crystal nucleating agent: trade name "ML 112" from Fuji Talc Industrial Co., Ltd. (talc)

TABLE 1

| | | | Example | | | | | | Comparative Example | |
|---|---|---|---|---|---|---|---|---|---|---|
| | | | 1 | 2 | 3 | 4 | 5 | 6 | 1 | 2 |
| Formulation [part by mass] | Polyamide (A) | Polyamide PA1 | 100 | 100 | 100 | 100 | 100 | 100 | 100 | 100 |
| | Flame Retardant (B) | Bromine-based Flame Retardant B1 | 49.4 | 49.4 | 49.4 | 49.4 | 49.4 | 49.4 | 49.4 | 49.4 |
| | Copolymer (C) | Copolymer C1 | 0.6 | 0.9 | 1.2 | 1.8 | 2.3 | 0.9 | 0 | 0.3 |
| | Filler (D) | Filler D1 | 77.6 | 77.6 | 77.6 | 77.6 | 77.6 | 77.6 | 77.6 | 77.6 |
| | Flame Retardation Aid | Flame Retardation Aid 1 | 7.1 | 7.1 | 7.1 | 7.1 | 7.1 | 7.1 | 7.1 | 7.1 |
| | Other Components | Drip Preventing Agent | 1.2 | 1.2 | 1.2 | 1.2 | 1.2 | 0 | 1.2 | 1.2 |
| | | Antioxidant | 0.5 | 0.5 | 0.5 | 0.5 | 0.5 | 0.5 | 0.5 | 0.5 |
| | | Mold Release Agent | 0.7 | 0.7 | 0.7 | 0.7 | 0.7 | 0.7 | 0.7 | 0.7 |
| | | Crystal Nucleating Agent | 0.2 | 0.2 | 0.2 | 0.2 | 0.2 | 0.2 | 0.2 | 0.2 |

TABLE 1-continued

|  | Example | | | | | | Comparative Example | |
|---|---|---|---|---|---|---|---|---|
|  | 1 | 2 | 3 | 4 | 5 | 6 | 1 | 2 |
| Flow Length of Polyamide Composition [mm] | 57 | 55 | 55 | 53 | 50 | 55 | 58 | 57 |
| MFR of Polyamide Composition (320° C., 2.16 kg) | 13.8 | 10.3 | 5.7 | 3.9 | 3.1 | 6.1 | 20 | 16.8 |
| Evaluation Flame Retardancy | V-0 | V-0 | V-0 | V-0 | V-0 | V-0 | V-2 | V-2 |
| Dripping | yes | no | no | no | no | no | yes | yes |
| Deformation Amount [mm] | 17 (*1) | 15 | 10 | 9 | 7 | 11 | X | X |

(*1): In Example 1, three of five test pieces did not drip, and therefore the three test pieces not having dripped were tested to measure the deformation amount.

As shown in Table 1, it is known that the polyamide composition of the present invention can form molded articles excellent in flame retardancy in thin-walled structures, and is also excellent in heat resistance and moldability.

The invention claimed is:

1. A polyamide composition comprising
a polyamide (A) having a melting point of 280° C. or higher and
a flame retardant (B),
which is such that, when a melt of the polyamide composition is injection-molded with a mold having a thickness of 0.5 mm and a width of 40 mm under the condition of a cylinder temperature higher by 20° C. than the melting point of the polyamide (A), an injection pressure of 74 MPa and a mold temperature of 140° C., the flow length is 40 mm or more, and
that the melt flow rate of the polyamide composition at a temperature of 320° C. and under a load of 2.16 kg is 15 g/10 min or less;
wherein the polyamide composition further comprises an aromatic vinyl copolymer (C),
wherein the aromatic vinyl copolymer (C) contains
a structural unit derived from an aromatic vinyl monomer, and
a structural unit derived from an α,β-unsaturated dicarboxylic anhydride; and
wherein the content of the α,β-unsaturated dicarboxylic anhydride-derived structural unit in the aromatic vinyl copolymer (C) is from 18 to 28% by mass.

2. The polyamide composition according to claim 1, wherein the glass transition temperature of the aromatic vinyl copolymer (C) is 140° C. or higher.

3. The polyamide composition according to claim 1, wherein the aromatic vinyl-derived structural unit contains a structural unit derived from at least one selected from the group consisting of styrene and α-methylstyrene.

4. The polyamide composition according to claim 1, wherein the α,β-unsaturated dicarboxylic anhydride-derived structural unit contains a structural unit derived from at least one selected from the group consisting of maleic anhydride and a monoalkyl-maleic anhydride having an alkyl group having 1 or more and 3 or less carbon atoms.

5. The polyamide composition according to claim 1, wherein the polyamide (A) is a semi-aromatic polyamide.

6. The polyamide composition according to claim 5, wherein, in the semi-aromatic polyamide, more than 50 mol % of the structural unit derived from the dicarboxylic acid that constitutes the semi-aromatic polyamide is a structural unit derived from an aromatic dicarboxylic acid, and more than 50 mol % of the structural unit derived from the diamine that constitutes the semi-aromatic polyamide is a structural unit derived from an aliphatic diamine having 4 to 18 carbon atoms.

7. The polyamide composition according to claim 6, wherein the aliphatic diamine is at least one selected from the group consisting of 1,6-hexanediamine, 1,9-nonanediamine, 2-methyl-1,8-octanediamine, and 1,10-decanediamine.

8. The polyamide composition according to claim 1, wherein the flame retardant (B) is a bromine-based flame retardant.

9. The polyamide composition according to claim 1, further comprising a filler (D).

10. The polyamide composition according to claim 9, wherein the polyamide composition is prepared by melt-kneading the polyamide (A), the flame retardant (B), the aromatic vinyl copolymer (C) and the filler (D).

11. The polyamide composition according to claim 1, wherein the polyamide composition is prepared by melt-kneading the polyamide (A), the flame retardant (B) and the aromatic vinyl copolymer (C).

12. A molded article of the polyamide composition of claim 1.

* * * * *